Aug. 16, 1960 G. K. GANTSCHNIGG ET AL 2,949,060
ARTICLE SUSPENSION ARRANGEMENT FOR AIRCRAFT
Filed Nov. 3, 1955 3 Sheets-Sheet 1
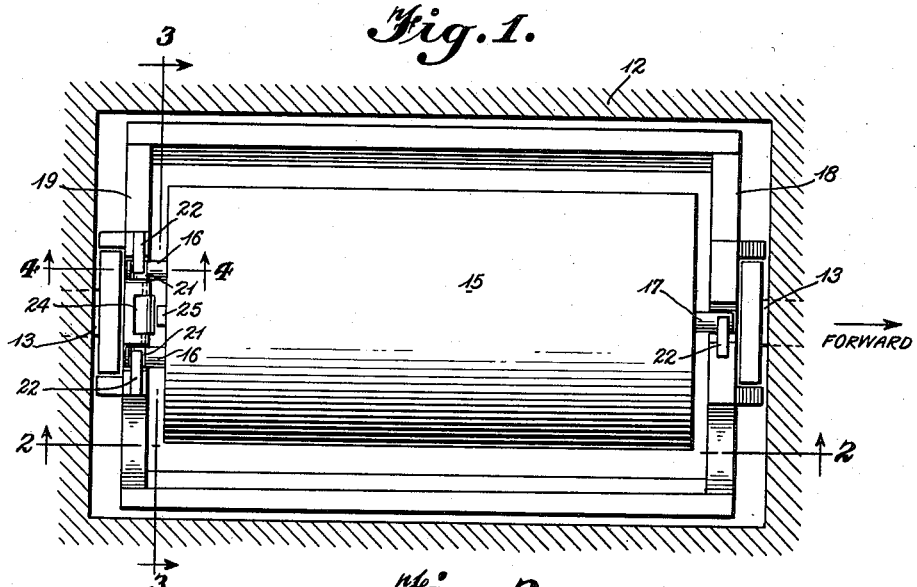
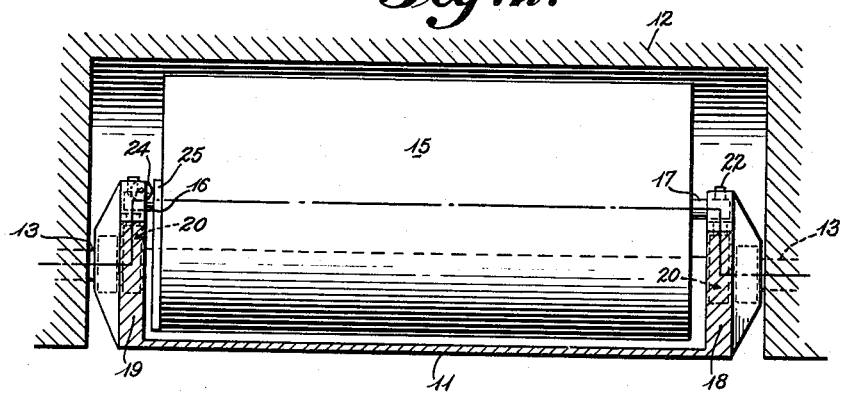
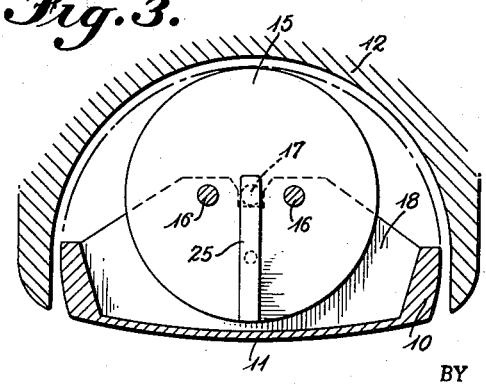
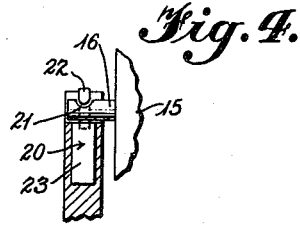
INVENTORS
GOTTFRIED KARL GANTSCHNIGG,
LOUIS MUEHLBERGER AND
ALBERT C. HAKE
BY
ATTORNEY

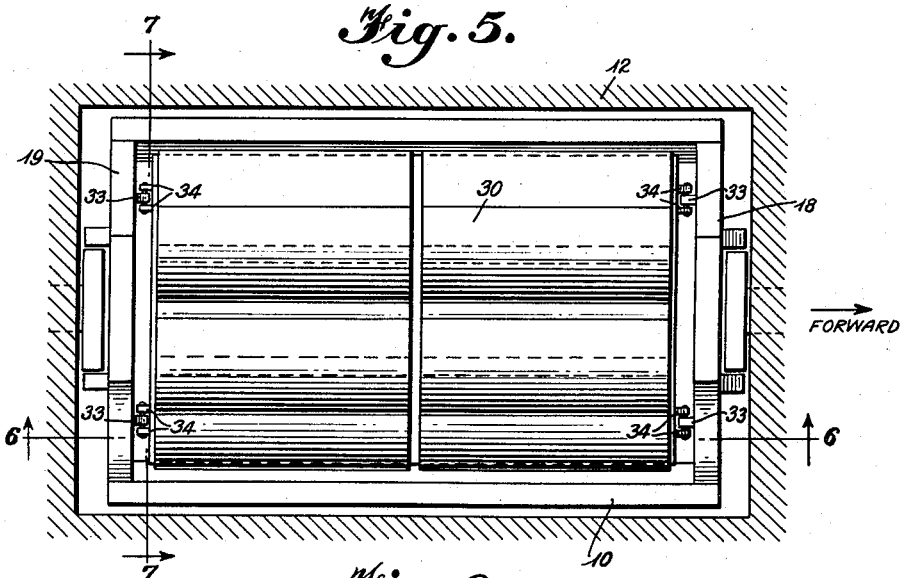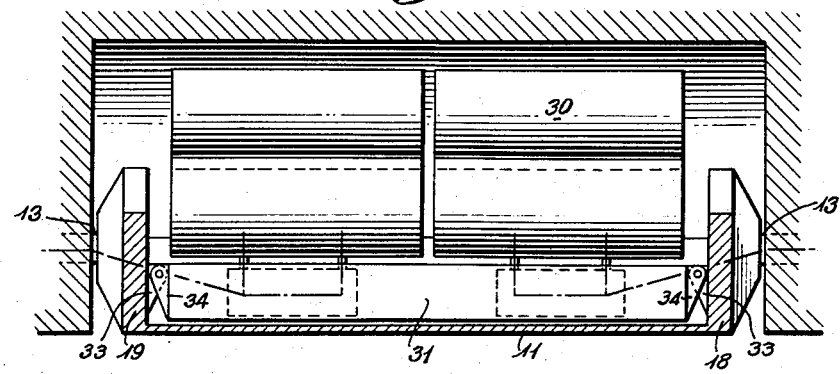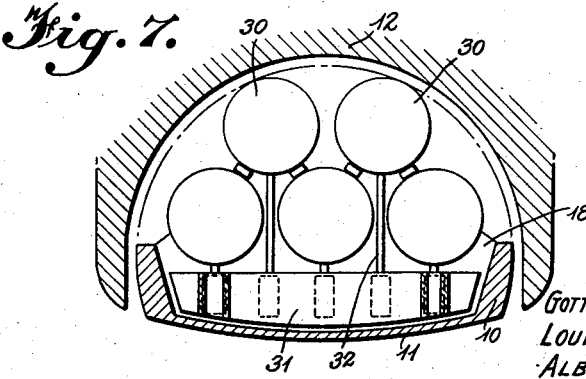

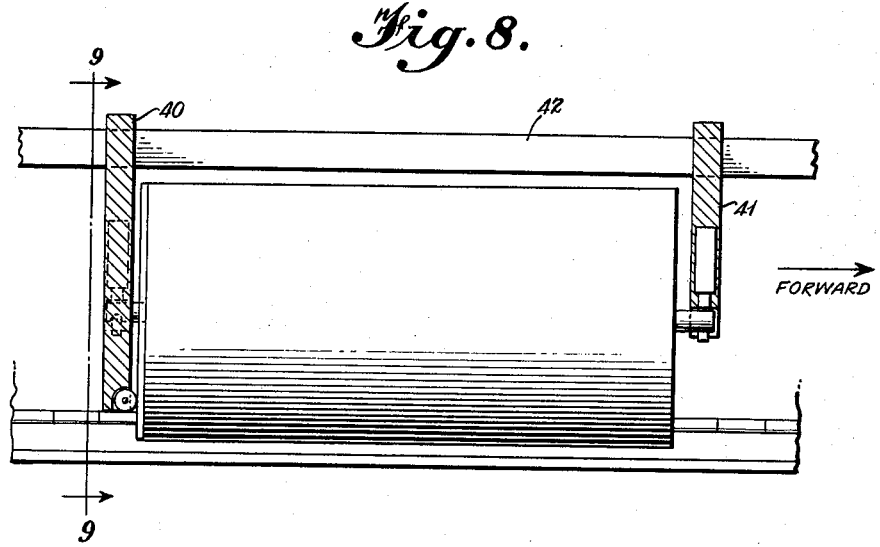
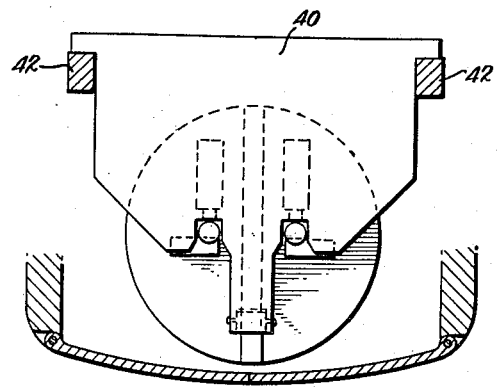

United States Patent Office 2,949,060
Patented Aug. 16, 1960

2,949,060

ARTICLE SUSPENSION ARRANGEMENT FOR AIRCRAFT

Gottfried Karl Gantschnigg, Baltimore, Louis Muehlberger, White Marsh, and Albert C. Hake, Middle River, Md., assignors to The Martin Company, Middle River, Md., a corporation of Maryland Filed Nov. 3, 1955, Ser. No. 544,762

1 Claim. (Cl. 89—1.5)

This invention relates to an improved article suspension arrangement for aircraft.

As the speeds of aircraft increase, the problem of providing arrangements for effective and accurate suspension of articles have been correspondingly increased. The articles encompassed by the present invention are those which are carried by an aircraft and which are intended to be dropped from the aircraft while in flight. With conventional article bay constructions, the articles are usually housed within the bomb bay and are attached by suitable shackles to the inner structure of the fuselage of the aircraft. It is customary to provide a bay opening in the ventral portion of the fuselage by providing a pair of bay doors adapted to pivot outwardly to create a space or opening through which the articles can be dropped. In this type of arrangement, there is formed in the bottom of the fuselage a relatively large opening which at high speeds causes extremely turbulent flow of air. In fact, it has been discovered that at high speeds the air is so turbulent in and around the bay opening that articles released from their shackles in ordinary fashion will actually tumble around inside the bay, an obviously dangerous situation. Moreover, the bay opening and the protruding bay doors cause a very great increase in drag tending to slow down the aircraft during a critical bombing run.

In order to overcome these disadvantages, it has already been proposed to provide an arrangement for maintaining the bay opening closed during critical bombing runs by arranging the bay doors for rotary motion about a central pivot. It has likewise been proposed to carry the load of articles on the doors themselves. These concepts are fully described in U.S. Patent No. 2,634,656, issued April 14, 1953.

According to the disclosure of the above patent, it is proposed to mount bombs or like articles to the bottom of a rotary door by means of a bomb rack and sway braces. Accordingly the rotary door must be constructed to support the great mass of the bombs or in other words, the bottom of the rotary door must be strong enough to take the load. Further, since the bombs are mounted to the bottom of the door, clearance space must be provided at the aft end of the bombs between the bomb and the door or fuselage structure forming the bay in order to permit the bombs to clear when released at high speeds.

It is an object of the present invention to provide a suspension arrangement for articles intended to be dropped from an aircraft while in flight. The articles within the contemplation of the invention include bombs, dispensers, fuel tanks, photographic gear, gun packages, rocket packages, survival gear, electronic equipment, target gear, etc. Essentially the present invention provides a suspension arrangement for supporting an article load at its ends by a pair of end members or plates. The suspension arrangement is adapted to be used in a conventional bay construction and is particularly adapted to be used in a bay construction having a rotary door.

It is an object of the present invention to provide a unique arrangement for suspending or mounting articles on a rotary door which will not impose the load of the articles on the bottom of the door. Hence, the structural design for the bottom of the door can be to lesser specifications and can be made much thinner, thereby increasing the amount of space within the bay available for the reception of articles.

It is an object of the present invention to provide a novel suspension means for articles on a rotary door which functions to transmit the load of the articles through the end bulk heads of the door leaving the bottom of the door load free.

It is a still further object of the present invention to provide unique suspension apparatus to hang articles on a rotary door which includes an effective ejector and release assisting mechanism which allows the aft end of the article to be closely located to the aft bulk head of the rotary door without danger of damage to the aircraft upon separation of the load.

Further and other objects of the present invention will become readily apparent from the following description and claims when considered in conjunction with the drawings in which:

Figure 1 is a view in horizontal section through a bay showing the improvements of the present invention;

Figure 2 is a view in section taken along line 2—2 of Figure 1;

Figure 3 is a view in section taken along line 3—3 of Figure 1;

Figure 4 is a view in section taken along line 4—4 of Figure 1;

Figure 5 is a view in transverse section taken similar to the view of Figure 1 looking down into a bay showing improvements according to a modified version of the invention;

Figure 6 is a view in section taken along line 6—6 of Figure 5;

Figure 7 is a view in section taken along line 7—7 of Figure 5;

Figure 8 is a view in section through a conventional bay construction which has been modified according to the present invention; and Figure 9 is a view in section of Figure 8 taken along line 9—9.

Referring now to the drawings, there will be described a preferred embodiment of the present invention. In order to simplify the following discussion, the present invention will be described as a suspension for bombs. As will be evident, Figures 1 to 4 inclusive display a bomb suspension arrangement for attaching bombs to a rotary door 10. The bottom 11 of door 10 is relatively thin as compared with prior constructions. The door 10 is mounted to the fuselage 12 of an aircraft by means of trunnion pins 13 located along the central elongated axis of the door 10. This mounting arrangement, since it is now conventional in the art, is shown only generally in the drawings. The structure or fuselage 12 of the aircraft defines the bomb bay which is of concave shape in order to permit the door 10 and any load carried by it to rotate on the pinions 13 through 360° with clearance (see Figure 3). A bomb 15 is mounted on the door 10 in the following fashion. The bomb is provided with a pair of pins 16 at its aft end and a single pin 17 at its forward end. The forward and aft bulk heads 18 and 19, respectively, of door 10 have mounted in them bomb rack ejector units 20 corresponding in number to the number of pins 16 and 17. Each of the pins 16 is provided with a groove or small recessed area 21, see Figure 4, which cooperates with a hook 22 constituting part of each bomb rack ejector 20. Each pin 16 is received on top of each bomb rack ejector 20 with its respective hook 22 received in the groove or recessed area 21 thus preventing axial shifting of bomb 15. Since only pins 16 have the groove 21 they alone will serve to take up axial load. The pin 17 is free to slide axially relative to its hook 22. This is desirable as there tends to be some deflection of the bulkheads 18 and 19. The bomb rack ejectors 20 are essentially each comprised of a cylinder 23 inside of which is slidably contained a piston which bears against the respective pin 16 or 17. Any means can be incorporated into the bomb rack ejector units 20 to operate the pistons. Thus, there may be incorporated an explosive charge or other self-contained energy source such as a spring, hydraulic unit, pneumatic unit, etc. The hooks 22 which are pivoted for action and pistons are actuated in sequence by the self-contained energy source with hooks 22 being actuated first. Thus, when the rotary door 10 is moved through a 180° arc so that the bomb now is exposed for dropping, the hooks 22 are pivoted or retracted when the bomb is to be released and the pistons within the cylinders 23 at this time positively eject the bombs from the rotary door 10.

As will be evident, the aft end of the bomb 15 is positioned closely adjacent to the aft bulk head 19 of the door 10. A release assisting arrangement is provided which functions during release of the bomb 15 to insure that the bomb 15 will clear the aft end of the door 10, without damaging it. For this purpose a roller 24 is mounted on the bulk head 19 arranged for free rotation with the roller projecting slightly beyond the inner surface of the bulk head 19. Fixed onto the aft end of the bomb 15 is a radially extending guide rail 25 in alignment with the roller 24. When the ejectors 20 release the bomb 15, the roller 24 and guide rail 25 cooperate to insure that the bomb 15 becomes fully separated from and clears the door 10 without causing damage. Thus, the drag load of the bomb 15 is taken by the aft or rear bulkhead via the roller 24. In the absence of this arrangement, there would be a tendency for the bomb 15 to jam back against the aft bulk head 19 when released since it would no longer have imparted to it the positive velocity of the aircraft. This will not happen, however, as the bomb 15 will be guided by roller 24 and rail 25 until it is free of the door and airframe.

The release assisting mechanism described above functions essentially in a friction-free manner during separation of bomb 15. It will be appreciated that the mechanism can take forms other than that specifically described. For example, in place of roller 24 there may be provided a stationary element which engages with rail 25 with sliding action.

From the above description, it will be seen that the bomb 15 is not supported on the bottom 11 of the door 10, but rather, the load of the bomb 15 is transferred by means of the pins 16 and 17 to the bulk heads 18 and 19 and through the trunnions to the fuselage. Accordingly, the bottom 11 of the door can be made relatively thin thereby increasing the amount of available space within the bomb bay. By adopting the three pin support for the bomb 15 there will be no tendency for the bomb 15 to rotate in the bomb bay about its own supports. The three pins take up the torque load.

Referring now to Figures 5 to 7 inclusive, there will be described a modified version of the present invention. In this form, a plurality of bombs 30 are arranged in the bomb bay shackled together and to a platform 31. The shackle means is identified generally by the numeral 32. The mounting of the platform to the rotary door is not to the bottom 11 but rather to the forward and aft bulk heads 18 and 19 respectively. In this version of the invention, the opposing faces of the bulk heads 18 and 19 are characterized by projecting lugs 33. One pair of lugs 33 are fixed on each bulk head 18 and 19. The platform 31 defines sets of closely spaced ears or lugs 34 each set of which fits around a corresponding lug 33 on the bulk heads 18 and 19. Pins 35 pass through each grouping of lugs 33 and 34 to complete the mounting of the platform 31. Thus, in this version of the invention, a plurality of bombs are mounted to a platform which in turn is supported from the end bulk heads of the door 10. Again, no weight is placed on the bottom 11 of the rotary door and thus the principal advantages of the first described embodiment are attained in this embodiment.

In Figures 8 and 9, there is illustrated a bomb suspended in a conventional bomb bay having doors that pivot outwardly. In this arrangement, a pair of end plates 40 and 41 are mounted to the aircraft frame 42 and may or may not be arranged for relative sliding movement together and apart in order to obtain variable spacing to accommodate different size articles. Each end plate 40 and 41 has mounted to it the bomb rack ejectors 20 and the aft or rear plate is provided with roller 24.

Although the present invention has been described with reference to specific embodiments, nevertheless, various changes and modifications obvious to one skilled in the art are deemed to be within the spirit of the invention.

What is claimed is:

A suspension arrangement for an aircraft for releasably supporting an elongated weapon that utilizes at least one support pin at its one end and at least a pair of spaced pins at its other end, said suspension arrangement comprising a rotary door having a bottom portion and end portions, means pivotally mounting said door in registry with a bay opening in said aircraft, said end portions being of substantial construction and having means for receiving the pins of a weapon so that the weapon will be supported solely and directly by said end portions, said receiving means on one of said end portions having ejection means for contacting the pin on the one end of a weapon and the receiving means on the other of said end portions having spaced ejection means for contacting a pair of spaced pins, said ejection means in said end portions positively separating the ends of a weapon from said door when the weapon is to be dispersed, and release assisting means on the aft end of said door for preventing damage during release of a weapon, said release assisting means comprising a roller arranged to contact and roll along the rearmost portion of the weapon during its release from said door, whereby said bottom portion of said door can be of minimum structural thickness and thereby enable a large diameter weapon to be carried on said door by virtue of the fact that said bottom portion need not be of high-strength construction.

References Cited in the file of this patent

UNITED STATES PATENTS

| | | |
|---|---|---|
| 1,221,426 | Duffy | Apr. 3, 1917 |
| 1,556,561 | Menchen | Oct. 6, 1925 |
| 1,725,473 | Page | Aug. 20, 1929 |
| 2,370,307 | Hall | Feb. 27, 1945 |
| 2,410,234 | Read et al. | Oct. 29, 1946 |
| 2,447,941 | Imber et al. | Aug. 24, 1948 |
| 2,585,870 | Spielman | Feb. 12, 1952 |
| 2,634,656 | Woollens et al. | Apr. 14, 1953 |
| 2,699,908 | Fletcher | Jan. 18, 1955 |
| 2,736,522 | Wilson | Feb. 28, 1956 |
| 2,822,207 | Steinmetz et al. | Feb. 4, 1958 |
| 2,826,120 | Lang et al. | Mar. 11, 1958 |

FOREIGN PATENTS

| | | |
|---|---|---|
| 579,310 | Great Britain | May 8, 1946 |